Figure 1:
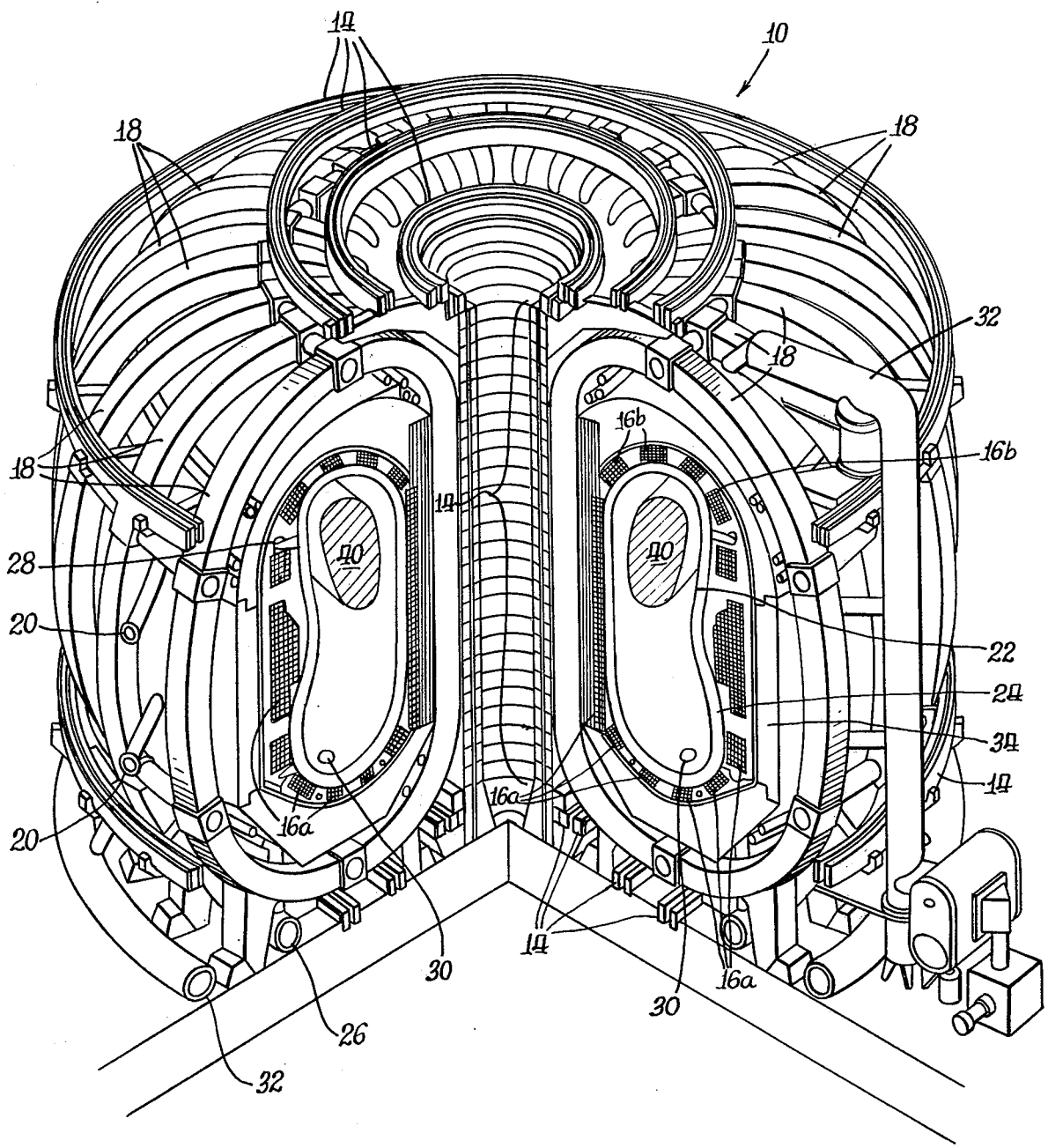

United States Patent [19]

Ohkawa

[11] 4,277,306
[45] Jul. 7, 1981

[54] COIL-LESS DIVERTORS FOR TOROIDAL PLASMA SYSTEMS

[75] Inventor: Tihiro Ohkawa, LaJolla, Calif.

[73] Assignee: General Atomic Company, San Diego, Calif.

[21] Appl. No.: 863,521

[22] Filed: Dec. 22, 1977

[51] Int. Cl.² .......................................... G21B 1/00
[52] U.S. Cl. .................................................. 176/9
[58] Field of Search ............................ 176/1, 3, 5, 9

[56] References Cited

U.S. PATENT DOCUMENTS

| | | | |
|---|---|---|---|
| 3,441,775 | 4/1969 | Hammel et al. | 176/1 |
| 3,692,626 | 9/1972 | Ohkawa | 176/5 |
| 3,713,967 | 1/1973 | Hamilton et al. | 176/3 |
| 3,801,438 | 4/1974 | Ohkawa | 176/3 |
| 4,065,351 | 12/1977 | Jassby et al. | 176/3 |

FOREIGN PATENT DOCUMENTS 1439391 6/1976 United Kingdom ................ 173/3

OTHER PUBLICATIONS

Nuclear Fusion vol. 3/71, Gourdon et al., pp. 161–166.
CONF -750905-P1, 9/75, p. 139, by Consoli et al.
7th European Conf. on Controlled Fusion and Plasma Physics, vol. II, 9/75, pp. 127–135, by Ainsworth et al.
Journal of Nuclear Materials, vol. 63, 1976, pp. 91–95, McCracken.
Nuclear Fusion vol. 8, 1968, Lehnert, pp. 173–181.
Nuclear Fusion vol. 16, No. 1, 2/76, Maeda et al., pp. 148–149.
CONF -721111, 4/74, Draper, Jr. pp. 63–85.

Primary Examiner—Harvey E. Behrend
Attorney, Agent, or Firm—Fitch, Even, Tabin, Flannery & Welsh

[57] ABSTRACT

Methods and apparatus for plasma impurity control in toroidal plasma systems such as Tokamak plasma systems is disclosed which utilize an axisymmetrical plasma diffusion pump system.

4 Claims, 2 Drawing Figures

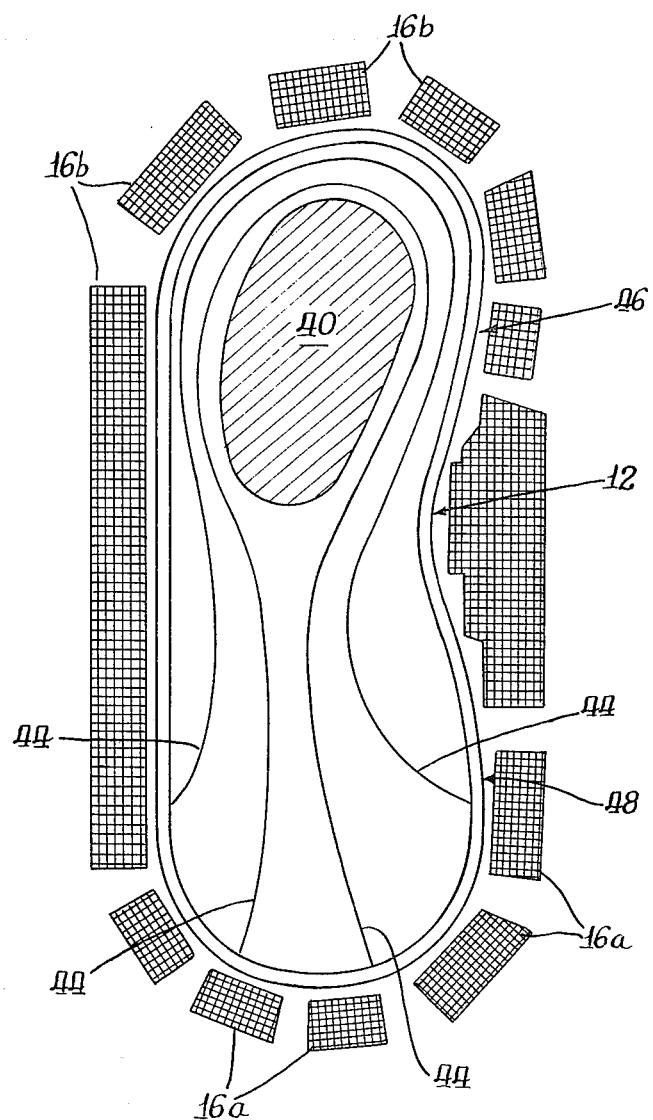

COIL-LESS DIVERTORS FOR TOROIDAL PLASMA SYSTEMS

The present invention is directed to methods and apparatus for confining and controlling plasmas, and more particularly, to such methods and apparatus for maintaining the purity of high temperature toroidal plasmas.

Various methods and apparatus have been developed for generating and confining plasmas, which are ionized gases comprising approximately equal numbers of positively charged ions and free electrons at high temperatures.

One general type of device for plasma confinement comprises an endless, closed tube, such as a toroid, with a geometrically co-extensive, externally imposed magnetic field (e.g., a toroidal magnetic field) in which magnetic lines of induction extend around the toroid generally parallel to its minor axis. Such a magnetic field is conventionally provided by electrical currents in one or more conductive coils encircling the minor axis of the toroid. Illustrative of such devices are the toroidal diffuse pinch plasma confinement devices of the Tokamak configuration, and such devices may be generally referred to hereinafter as tokamak devices or systems. The toroidal configuration may be advantageously employed with plasmas and plasma confinement systems or noncircular cross-section either with respect to planes perpendicular to the minor axis or the major axis such as those involving plasma configurations which are axisymmetrically elongated in a direction parallel to the major toroidal axis. In this connection, U.S. Pat. Nos. 3,692,626 and 3,801,438 illustrate plasma generation and confinement apparatus of the toroidal type having a noncircular cross-section in respect of a plane parallel to and intercepting the major toroidal axis.

As previously indicated, toroidal systems for the containment of high-temperature plasmas comprise means for providing a strong, toroidal magnetic field in which the plasma is to be embedded, and which is conventionally provided by electrical current in one or more conductive coils encircling the minor toroidal axis. The term "axis" as used herein to include multiple axes or axial surfaces, such that reference to toroidal systems may include such systems having a noncircular cross-section such as utilized in the various Doublet devices of the assigness of the present invention. Toroidal plasma systems, which are hereinafter generally referred to as tokamak systems, may also comprise means for providing a toroidal electric field to produce a current flowing in the plasma, generally in the direction of the minor axis, and this plasma current in turn may generate a magnetic field component which is poloidal (i.e., the magnetic flux lines are closed about the minor toroidal axis). The combination of the poloidal magnetic field produced by the plasma current, with the toroidal magnetic field produced by the toroidal cell current, is suitable for providing helix-like magnetic field lines that generally lie on closed, nested magnetic surfaces. The plasma is accordingly subjected to confining, constricting forces generated, at least in part, by the current flowing in the plasma. The resulting magnetic field provides for a diffused pinching force in the confining magnetic field which may be substantially greater than the outward pressure of the plasma.

The generation of a current in the plasma may conventionally be provided in various ways, such as by providing current in an inductive primary coil configured such that the plasma serves as the secondary coil of a transformer system. Such inductive current further provides for inductive, ohmic heating of the plasma, and systems for more continuous heating of tokamak plasmas are known in the art.

An important difficulty in the initial formation and sustained maintenance of a high temperature plasma is the problem of excluding impurity atoms from the plasma, and the substantial and potentially disabling plasma energy losses which result from the presence of such impurities.

The impurities in a plasma generally originate from two principal sources. First, contaminants such as oxygen, nitrogen or carbon may be absorbed on the chamber walls surrounding the plasma zone, and driven therefrom by the conditions which are employed to initially form the plasma. The other principal source of contaminants results from the bombardment of the chamber wall material itself by energetic plasma particles and radiation. Further, fusion reactions may generate high energy particles which will increase the problem of contaminants from wall bombardment. Suitable vacuum techniques and high temperature baking may be employed to minimize the adverse effect of absorbed contaminants, but the problem of contaminants produced by bombardment and erosion of the chamber walls have provided substantial difficulties. Complicated magnetic divertor systems have been designed in an effort to overcome the problem in some types of plasma confinement systems, but such divertors are expensive, complex and have various other disadvantages.

Conventional divertors are intended to skim off the most contaminated plasma near the wall and are generally structured orthogonally to the minor toroidal axis, such that partical diversion occurs radially outwardly of the minor axis in a cross sectional plane through the plasma. Such poloidal divertors, such as that of the Poloidal Divertor experiment, are designed essentially to bury hot protons into a divertor plate away from the main plasma, to differentially pump away any sputtered atoms before they reach the main plasma, and to ionize sputtered atoms produced by hot neutral hydrogen at the wall facing the main plasma, and carry the ionized atoms to the divertor plate. Conventionally, a magnetic configuration with a separatrix encircling the divertor coil is employed to neck down the passage between the divertor region and the main plasma for differential pumping in order to perform these functions, but such divertor coils must be in the vacuum and also must be shielded from fusion neutrons in a reactor. Such considerations make a plasma confinement system or a plasma fusion reactor very complicated and expensive.

The presence in the plasma of impurities, such as those originating from the walls of the chamber surrounding the plasma, leads to undesirable energy loss in the form of radiaton, which in turn has a deleterious effect on the formation and/or maintenance of a high temperature plasma. These energy losses arise because the contaminants generally have a higher atomic number than hydrogen, and the type of electronic excitation, ion recombination and bremsstrahlung radiation losses produced by their presence in a hydrogen plasma (i.e., hydrogen, deuterium, tritium and mixtures thereof)

become increasingly deleterious with increasing atomic number of the contaminant.

The problem of plasma contamination by impurities may be further aggravated in toroidal confinement systems by the toroidal geometry itself. In toroidal plasma configurations, the inward flow of contaminant impurity ions from the chamber zone surrounding the plasma is enhanced by Pfirsch-Schluter effects. In this regard, each different contaminant ion species has a characteristic flow pattern in which an upward (or downward depending on the polarity of the toroidal magnetic field) flow with respect to the major axis, due to the toroidal drift in the toroidal configuration, is followed by the return flow along the magnetic field line. However, because of the difference of electric charge between the various species of impurity ions, the flow velocities of the different species are correspondingly different. The resulting collisional friction between the different species will disrupt the otherwise established pattern and result in the enhanced inward motion of impurity ions from the surrounding zone into the plasma. [P. Rutherford, Princeton Plasma Laboratory MATT-1039 (1974)].

Methods and apparatus without the undesirable internal coils of poloidal divertors have been devised which utilize an axisymmetric source-sink system for impurity flow control or reversal [K. Burrell, "Effect of Particle and Heat Sources on Impurity Transport in Tokamak Plasmas," Phys. Fluids, 19, 401 (1976); T. Ohkawa, Kakuyugo-Kenkyu, 32, 61 (1974)], but further developments in respect of impurity control are desirable.

Accordingly, it is an object of the present invention to provide a method and apparatus for control of impurity ions in toroidal plasma systems without the use of internal coils. It is a further object to provide such a method and apparatus which may be relatively simple, which do not unduly disrupt the delicate dynamics of the toroidal plasma confinement systems, and which may be used with existing toroidal systems without prohibitively substantial structural or design alterations.

These and other objects of the present invention are more particularly set forth in the following detailed description and in the accompanying drawings, of which:

FIG. 1 is a perspective view, partially broken away of a toroidal plasma system illustrating an embodiment of the present invention; and FIG. 2 is a cross-sectional view taken through line 2—2 of the plasma chamber of the toroidal plasma system of FIG. 1.

Generally, the present invention is directed to methods for the control of impurity flow in toroidal plasma systems by providing a magnetic confinement system having outer flux lines which are axisymmetrically bound with respect to the plasma. In this connection, a confining field is provided which has outer flux lines bound in a zone adjacent the plasma and displaced from the plasma in a direction along the major toroidal axis opposite the direction of positive ion toroidal drift. This may be accomplished by providing a relocatively high flux value in the plasma confinement zone, and a relatively low flux value in the adjacent flux binding zone. By further providing a particle sink such as a vacuum pumping zone in the zone adjacent the plasma, in which outer magnetic flux lines of the plasma are bound to vacuum chamber walls, a plasma diffusion pump may be provided which is adapted to control impurities, but which does not require complicated poloidal divertor structures using internal coils.

Apparatus which may be adapted for performance of the present invention comprises the elements of toroidal plasma confinement systems, preferably of Tokamak design and more preferably of Tokamak design and having a noncircular plasma cross section which is elongated in a direction along the major toroidal axis. Such tokamak systems for the containment of high-temperature plasmas comprise means for providing a strong, toroidal magnetic field in which the plasma ring is to be embedded, and which is generally provided by electrical current in one or more conductive coils encircling the minor toroidal axis. Such systems also comprise means for providing a toroidal electric field to maintain a toroidal current flowing in the plasma, and this plasma current in turn generates a magnetic field component which is poloidal. The combination of the poloidal magnetic field with the toroidal magnetic field with the toroidal magnetic field produces resultant magnetic field lines that lie on closed, nested magnetic surfaces, and the plasma is subjected to confining, constricting forces generated by the current flowing in it. The toroidal confinement systems may also include various means to generate, heat or otherwise control the plasma, such as neutral beam injection systems. Examples of apparatus which may be utilized in connection with the present invention include the Doublet III apparatus of General Atomic Company and the ISX tokamak system of Oak Ridge National Laboratory.

The invention will now be more particularly described with specific reference to the toroidal plasma confinement system 10 illustrated in FIGS. 1 and 2 of the drawings.

The plasma generation and confinement apparatus 10 may be a toroidal fusion reactor for producing high energy neutrons by nuclear reaction occasioned by the fusion of deuterium and tritium nuclei, or may utilize the light hydrogen isotope in provision of a high temperature plasma for study of plasmas or any other use to which hydrogen plasmas may be put. The apparatus 10 has a large toroidal reaction chamber 12 for plasma generation and confinement. A plasma may be created in the vacuum chamber 12 by an appropriate poloidal field, established by E-coils 14. When the E-coils are energized, they produce a time varying magnetic flux linking the chamber 12. The electric field induced by this flux variation initiates and maintains the toroidal discharge current required for plasma confinement and ohmic heating. F-coils 16a, b control the magnetic configuration and position of a plasma discharge in a predetermined manner. The F-coil system establishes the magnetic boundary conditions for the plasma 40 in the upper zone of vacuum chamber 12 and may be varied to control the position and other parameters of the plasma 40. Also provided around the chamber 12 are toroidal B-coils 18, which establish an azimuthal magnetic field for stable plasma confinement. The F-coils 16a, b are programmed to provide a higher flux $\psi$ value in the upper chamber, such that the outer magnetic lines of flux intersect with the vacuum chamber walls in the lower zone of the vacuum chamber adjacent the plasma, and such that a "D" shaped plasma is provided in the upper zone of chamber 12.

The $\psi$ flux values and outer, bound flux lines 44 are shown in more detail in FIG. 2, where the plasma zone comprising the predominant amount of the plasma [e.g., at least 90% of the plasma mass] is shown as shaded plasma region 40. As indicated, the $\psi$ value of the upper portion 46 of the vacuum chamber 12 is greater than the $\psi$ value of the lower portion 48 of the chamber, such that the outermost magnetic flux lines (indicated by lines 44) adjacent the walls of the chamber 12 in the upper portion 46, are directed to intersect the chamber walls in the lower portion 48. Of course, inner flux lines in the upper chamber are closed, or continuous, such that charged particles of the plasma 40 which are influenced by electromagnetic forces to follow the flux lines will experience force tending to confine the plasma in the zone 40. However, ionized particles adjacent the chamber 12 walls which tend to follow the outer flux lines, will experience a charge particle path which intersects with the wall in the lower portion 48 of the chamber 12.

The plasma conditions are initiated at relatively low pressures. Hence, the chamber 12 is constantly pumped out by vacuum pumps through ports 30 located at the bottom of the vacuum chamber 12 and corresponding conduits 32.

At the high temperatures thus produced in the reaction region containing the plasma, the deuterium and tritium nuclei may undergo fusion, producing helium nuclei and high energy neutrons. Such neutrons at energies of about 14 MeV may penetrate the first wall 22 and pass into a blanket 24 surrounding the chamber 12. The blanket 24, formed in part of carbon and lithium, is used for extracting the energy from the neutrons, raising the temperature of the blanket 24. Helium gas may be circulated through the blanket 24 from a conduit 26. Cool helium is introduced into the conduit 26, and heated helium is withdrawn from a conduit 28. The helium provides a safe, yet effective, heat transfer function, carrying heat from the reactor to an external heat exchanger, and recirculated through conduit 26. A radiation shield 34 may be provided to limit the escape of harmful radiation.

By providing a particle sink such as a vacuum pump system in the lower chamber zone, impurity particles adjacent the chamber walls may thus be collected at the lower zone and removed from the system. By providing a hydrogen source in the upper chamber zone, such as the neutral beam system input, the net impurity flow into the lower zone is enhanced.

The illustrated apparatus 10 may be regarded as an axisymmetrical plasma diffusion pump. Magnetic flux lines 44 are bound between two walls (i.e., intersect the lower walls of the vacuum chamber at two places). Hydrogen gas is introduced in the middle and r-f power from a suitable source (not shown) is applied to ionize the gas. Resulting plasma flows along the outer flux lines towards the wall in the lower portion of the chamber at sound velocity. Because the impurity atoms produced at the wall are ionized in a much shorter distance than the distance to the main plasma, the plasma flow will push the impurity ions back towards the wall by collisional and/or electrostatic interaction. In the case of collisional pumping, the conditions that the impurity ions are ionized in a short distance may be represented by $$\frac{v_o}{n(\sigma v)_{ion}} << a$$

The condition that the collisions between protons and impurity ions are sufficiently frequent to produce collisional pumping may be represented as:

$$v_{iz} < \frac{2T_i}{v_s l m_p} \tag{2}$$

where $v_o$ is the velocity of sputtered atom, n is the plasma density, $<\sigma v>$ is the ionization probability, a is the distance from the wall to the main plasma, $v_{iz}$ is the proton-impurity collision frequency, $T_i$ is the plasma ion temperature, $m_p$ is the proton mass, $v_s$ is the sound velocity of the plasma, and l is the distance along a line of magnetic induction from the main plasma to the intersection of that line of magnetic induction with the vacuum chamber wall. By utilizing the following relationship of $v_{iz}$;

$$v_{iz} \approx nZ^2 10^{-12}(T_i/e)^{-3/2} \text{sec}^{-1} \tag{3}$$

Equation (2) may be rewritten as:

$$nl > 2 \times 10^{16}(T_i/e)^2(T_i/T_e)^{\frac{1}{2}}Z^{-2} \tag{4}$$

where $T_e$ is the electron temperature and Z is the charge of impurity ions.

The ion temperature $T_i$ may be estimated from the energy balance, i.e., $$v_{ei}(T_e - T_i) = 2T_i v_s/l \tag{5}$$

or $$T_i = \frac{T_e}{1 + 4 \times 10^{17}(T_e/e)^2 \ln} \tag{6}$$

There are two regimes depending on plasma density, as follows:

$$\ln \gtrless 4 \times 10^{17}(T_e/e)^2 \tag{7}$$

For the high density case, where ln is greater than $4 \times 10^{17}$ $(T_e/e)^2$, the electron temperature $T_e$ is approximately equal to the plasma ion temperature $T_i$, and Equation (4) is satisfied for Z less than 5. For the low density case where ln is less than $4 \times 10^{17}$ $(T_e/e)^2$, the ion temperature $T_i$ may be represented as:

$$T_i \sim \frac{T_e \cdot \ln}{4 \times 10^{17}(T_e/e)^2} \tag{8}$$

By combining Equation (8) with Equation (4), $$nl < 3 \times 10^{18}(T_e/e)^2 Z^{4/3} \tag{9}$$

This condition is automatically satisfied. The lower limit of the density is given by Equation (4) by utilizing the lowest value for the ion temperature and by Equation (7). For an electron temperature equal to ionization potentials, Equation (1) becomes $$n >> 2 \times 10^{12}(v_o/a) \tag{10}$$

By assuming the sound velocity $v_o$ to be approximately equal to $1 \times 10^3$ meters per second, we have $$n >> 2 \times 10^{15} a^{-1} m^{-3} \tag{11}$$

As indicated, the pumping interaction may be collisional and/or electrostatic, and in a substantially collisionless system, the pumping is done by electrostatic potential. When the hydrogen plasma flows towards the lower vacuum chamber wall at sound velocity and where the electron temperature $T_e$ is very much greater than the plasma ion temperature $T_i$ ($T_e >> T_i$) there is an electrostatic potential accelerating the protons. The potential is of the order of about $T_e/e$. The impurity atoms, after becoming ionized, are repelled by the potential barrier, if the electron temperature $T_e$ is greater than $W_z/Z$, where $W_z$ is the kinetic energy of the impurity atoms. The condition on the plasma density in this case is that the plasma flow be substantially unaffected by the impurity flux, that is, that the proton density shall be much higher than the impurity density.

The impurity density $n_z$ may be estimated from the sputtering yield, by the following relationship:

$$n_z = \alpha \frac{n_h}{\tau_h} \frac{a\delta}{v_o} \quad (12)$$

where $\alpha$ is the sputtering yield, $n_h$ is the plasma density of hot plasma, $\tau_h$ is the particle confinement time of hot plasma, and $\delta$ is the ratio of volume of hot plasma, and volume of divertor space.

For typical plasma parameters of the illustrated apparatus 10, $n_h = 10^{20} m^{-3}$, $\tau_h = 0.5$ sec, $a = 0.5$ m, $\delta = 1$, $\alpha = 0.1$, and $v_o = 10^3$ m/sec. Accordingly, from Equation (12) the impurity density $n_z$ under such conditions is about $1 \times 10^{16}$ m$^{-3}$.

The condition for ionization as set forth in Equation (1) is:

$$n >> \frac{v_o}{(\sigma v)_{ion} a} = 2 \times 10^{16} m^{-3} \quad (13)$$

Accordingly, it will be appreciated that these two conditions are not very different.

The power P required to maintain the divertor plasma may be represented as:

$$P = \frac{3nT_e}{2} \frac{4 \cdot a^2 \, 2\pi R \cdot v_s}{l} \quad (14)$$

where R is the major radius. By substituting a plasma length which is approximately equal to Rq (q is the safety factor), the power P may be represented as:

$$P = \frac{12 n T_e a^2 v_s}{q} \quad (15)$$

For typical plasma parameters of the illustrated embodiment, $n = 2 \times 10^{17}$, $q = 3$, $T_e = 20$ eV, $a = 0.5$ m, and $v_s = 4.5 \times 10^4$ m/sec, the power P may be seen from Equation (15) to be about 30 kW.

Turning back to the drawings of FIGS. 1 and 2, a D-shaped plasma 40 is produced in the top half of the chamber 12. The flux surfaces 44 that are not closed in the chamber are made to intersect with the wall in the bottom half. As indicated previously, pure hydrogen gas may be supplied to the upper portion of the vacuum chamber containing the plasma 40 and the vacuum pump ports are in the bottom half. However, a separate gas supply may not be needed, if sufficient gas is introduced to the plasma 40 by means of the neutral beam injector utilized for heating of the plasma 40. A 50 kW r-f power system is applied to maintain the low temperature plasma in the bottom half of the chamber 12. The low temperature plasma has a density of about $10^{11}$ cm$^{-3}$ and temperature of about 20 eV. The r-f heating system may be lower hybrid resonance type operating at a frequency of about 1 GHz. The pumping speed of the bottom half of the chamber around the torus of the illustrated embodiment is approximately $10^9$ cc/sec. Therefore, the neutral gas density is of the order of $10^{-5}$ Torr. Coating of the wall with titanium may be used to increase the pumping speed.

The density and the temperature of the pumping plasma in the illustrated embodiment generally corresponds to the temperature and density of plasma present near the wall or behind the limiter of typical tokamak plasma systems. The heating power utilized to maintain the pumping plasma is a very small fraction of the power throughput of the tokamak plasma 40 in the upper chamber. As is the case of conventional divertors, the design constraint is mainly due to pumping speed.

While the method has been particularly described with respect to utilization with Doublet III apparatus, the method may also be used with other apparatus such as the ISX apparatus of ORNL. Furthermore, while the method has been particularly described with respect to a specific operational embodiment, it will be appreciated that various modifications, adaptations and variations will become apparent from the present disclosure and are considered to be within the spirit and scope of the present invention as defined by the following claims.

Various of the features of the invention are set forth in the following claims.

What is claimed is:

1. In a toroidal plasma confinement method including the steps of providing a toroidal vacuum chamber zone, providing a high temperature hydrogen plasma in the vacuum chamber zone and a toroidal magnetic field in which the plasma is embedded, and providing a poloidal magnetic field in which the plasma is embedded, the improvement comprising controlling plasma impurities by generating a magnetic plasma confining field for confining a high temperature plasma having continuous inner flux lines in a high temperature plasma zone in a plasma vacuum chamber without internal divertor coils, which chamber is elongated in a direction along the major toroidal axis, generating a region of lower magnetic field strength in said elongated vacuum chamber for confining a plasma of lower temperature than said high temperature plasma to provide said poloidal field with a field configuration in which the radially outer flux lines of said poloidal magnetic field about the high temperature plasma are axisymmetrically bound to terminate at the vacuum chamber wall about said region of lower magnetic field strength adjacent the high temperature plasma in a direction along the major toroidal axis opposite the direction of positive ion toroidal drift, providing a source of pure hydrogen at the high temperature plasma zone, evacuating the low temperature plasma zone, and maintaining a low temperature plasma adjacent the high temperature plasma.

2. A method in accordance with claim 1 wherein said low temperature plasma in maintained by r-f heating.

3. A method in accordance with claim 1 wherein impurity control is accomplished at least in part by collisions between protons and impurity ions sufficient to produce collisional pumping.

4. A method in accordance with claim 1 wherein impurity control is accomplished at least in part by electrostatic pumping.

* * * * *